(12) United States Patent
Pardee

(10) Patent No.: US 8,844,701 B2
(45) Date of Patent: Sep. 30, 2014

(54) ROTATIONAL COUPLING DEVICE WITH IMPROVED DRIVE KEY RETENTION STRUCTURE

(75) Inventor: James A. Pardee, Glen Ellyn, IL (US)

(73) Assignee: Warner Electric Technology LLC, Braintree, MA (US)

( * ) Notice: Subject to any disclaimer, the term of this patent is extended or adjusted under 35 U.S.C. 154(b) by 1749 days.

(21) Appl. No.: 12/048,638

(22) Filed: Mar. 14, 2008

(65) Prior Publication Data

US 2009/0229941 A1 Sep. 17, 2009

(51) Int. Cl.
*F16D 27/14* (2006.01)
*F16D 27/112* (2006.01)
*F16D 1/08* (2006.01)
*F16D 67/06* (2006.01)
*F16D 27/01* (2006.01)
*F16D 13/58* (2006.01)

(52) U.S. Cl.
CPC ............ *F16D 27/112* (2013.01); *F16D 1/0876* (2013.01); *F16D 2013/581* (2013.01)
USPC ...................... 192/84.961; 403/356

(58) Field of Classification Search
USPC ................................................... 192/84.961
See application file for complete search history.

(56) References Cited

U.S. PATENT DOCUMENTS

| 2,623,765 | A | * | 12/1952 | Coquille ........................ 403/356 |
| 2,994,548 | A | * | 8/1961 | McGogy ........................ 403/356 |
| 4,217,061 | A | * | 8/1980 | Eiland et al. .................. 403/313 |
| 4,449,622 | A | * | 5/1984 | Okano et al. ............. 192/84.941 |
| 5,285,882 | A | * | 2/1994 | Pardee ..................... 192/84.961 |
| 6,106,187 | A | * | 8/2000 | Mina ............................. 403/356 |

* cited by examiner

*Primary Examiner* — Jacob S Scott
(74) *Attorney, Agent, or Firm* — Dykema Gossett PLLC

(57) ABSTRACT

A rotational coupling device for use as a clutch and/or brake is provided with improved retention of a drive key during shipping, assembly, and operation of the device. The device includes a rotor disposed about an input shaft. The input shaft is disposed about a rotational axis and the rotor and input shaft define opposed keyways. A key is disposed in the keyways and rotatably couples the rotor and input shaft. An armature is disposed about the axis and coupled to an output member and configured for selective engagement with the rotor. In one embodiment, the key and a support member in the device are shaped in a complementary fashion to limit radial and axial movement of the key. In another embodiment, an axial end of the key or rotor is deformed to axially align the axial ends of the key and rotor and limit axial movement of the key.

22 Claims, 2 Drawing Sheets

US 8,844,701 B2

ROTATIONAL COUPLING DEVICE WITH IMPROVED DRIVE KEY RETENTION STRUCTURE

BACKGROUND OF THE INVENTION

1. Field of the Invention

This invention relates to rotational coupling devices such as brakes and clutches and, in particular, to a rotational coupling device that improves retention of a drive key during shipping, installation, and operation of the device.

2. Discussion of Related Art

Rotational coupling devices such as clutches and brakes are used to control transfer of torque between rotational bodies. One type of conventional device is illustrated in U.S. Pat. Nos. 5,119,918, 5,285,882 and 5,971,121, the entire disclosures of which are incorporated herein by reference. This device includes a rotor that is coupled to an input shaft for rotation with the input shaft about a rotational axis. A field shell is also disposed about the input shaft on one side of the rotor and is fixed against rotation. The field shell defines radially spaced, axially extending inner and outer poles between which an electrical conductor is disposed, facing the rotor. A brake plate is coupled to the field shell and axially spaced from the field shell. The brake plate is disposed on a side of the rotor opposite the conductor. An armature coupled to an output member is disposed on the same side of the rotor as the brake plate and is disposed axially between the rotor and the brake plate. The armature is coupled to an output member by a plurality of leaf springs. Energizing the conductor produces a magnetic circuit in the field shell, rotor and armature that draws the armature into engagement with the rotor and couples the input shaft and output member together for rotation. Upon deenergization of the conductor, the leaf springs draw the armature out of engagement with the rotor and into engagement with the brake plate to brake the armature and output member. Permanent magnets coupled to the brake plate are also used to create another magnetic circuit between the brake plate, the field shell and the armature to assist the leaf springs in braking the armature and output member.

The rotor in the above-described rotational coupling devices is generally coupled to the input shaft using a key. In some conventional devices, the key is formed as a separate component that extends into opposed keyways in the rotor and the input shaft. During assembly of the coupling device onto an input shaft, the key must be inserted into the opposed keyways of the input shaft and rotor. Positioning the key at the proper orientation to avoid damage to the keyways is difficult and consumes valuable assembly time. Further, the key has a tendency to travel relative to the rotor and/or input shaft during assembly and operation of the device leading to misalignment of components, increased downtime and maintenance costs.

The inventor herein has recognized a need for a rotational coupling device that will minimize and/or eliminate one or more of the above-identified deficiencies.

SUMMARY OF THE INVENTION

The present invention provides a rotational coupling device.

A rotational coupling device in accordance with one embodiment of the present invention includes a rotor disposed about an input shaft. The input shaft is disposed about a rotational axis and the rotor and the input shaft define opposed keyways. The device also includes a key disposed within the opposed keyways of the rotor and the input shaft. The key rotatably couples the rotor and the input shaft. The device further includes an armature disposed about the axis. The armature is coupled to an output member and configured for selective engagement with the rotor. Finally, the device includes a support member disposed about the axis and configured to receive the key. The key and the support member are shaped in a complementary fashion to limit radial movement of the key relative to the support member in a first radial direction and to limit axial movement of the key relative to the support member in a first axial direction.

A rotational coupling device in accordance with another embodiment of the present invention includes a rotor disposed about an input shaft. The input shaft is disposed about a rotational axis and the rotor and the input shaft define opposed keyways. The device also includes a key disposed within the opposed keyways of the rotor and the input shaft. The key rotatably couples the rotor and the input shaft. The device further includes an armature disposed about the axis. The armature is coupled to an output member and configured for selective engagement with the rotor. One of a first axial end of the key and a first axial end of the rotor is axially aligned with another of the first axial end of the key and the first axial end of the rotor to limit axial movement of the key relative to the rotor in a first axial direction.

A rotational coupling device in accordance with the present invention represents an improvement over conventional devices. The keys or surrounding clutch structure such as the rotor or a support member are configured to limit relative radial or axial movement of the key. As a result, the key remains in place during shipping, during assembly of the device onto an input shaft, and during operation of the device. In this manner assembly time is reduced, the potential for damaging the input shaft or device structure is lessened, and maintenance and downtime are reduced.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
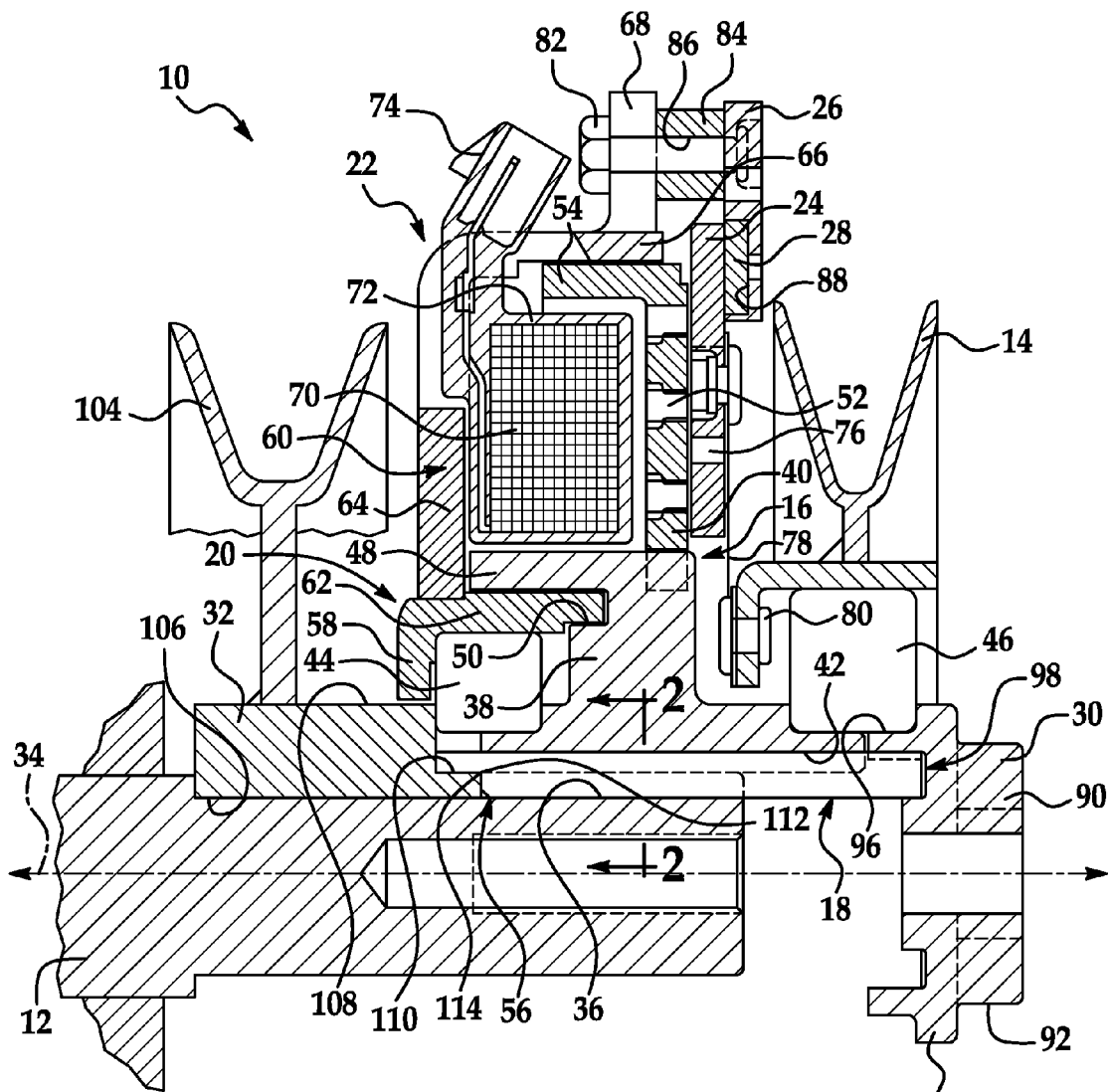
FIG. 1 is a partial cross-sectional view of a rotational coupling device in accordance with one embodiment of the present invention.

Referring now to the drawings wherein like reference numerals are used to identify identical components in the various views, FIG. 1 illustrates a rotational coupling device 10 in accordance with one embodiment of the present invention. Device 10 functions as a clutch to selectively transfer torque from an input shaft 12 to an output member 14. Device 10 also functions as a brake on output member 14 when torque is not being transferred to output member 14. Device 10 may be provided for use in a riding lawnmower or similar device. It will be understood by those of ordinary skill in the art, however, that device 10 may be used in a wide variety of applications requiring a clutch or brake. Device 10 may include a rotor 16, a key 18, a field shell 20, an electrical conduction assembly 22, an armature 24, a brake plate 26, one or more permanent magnets 28 and one or more support members such as spacer 30 or pulley hub 32.

Figure 2:
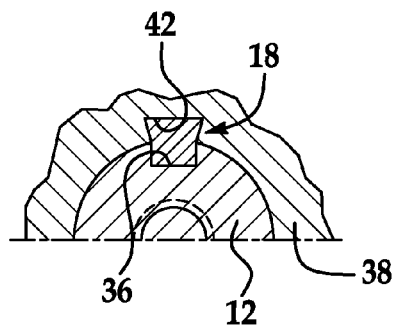
FIG. 2 is a partial cross-sectional view of several components of the rotational coupling device of FIG. 1.

Input shaft 12 provides a source of torque for driving output member 14. Shaft 12 may be made from conventional metals and metal alloys and may be solid or tubular. Shaft 12 is centered about a rotational axis 34 and is driven by an engine, electric motor or other conventional power source. In the illustrated embodiment input shaft 12 is inserted into device 10 on a side of device 10 opposite output member 14. It should be understood, however, that the orientation of input shaft 12 and spacer 30 could be reversed such that input shaft 12 is inserted into device 10 on the same side as output member 14. Referring to FIG. 2, shaft 12 defines an axially extending keyway 36 configured to receive key 18.

Referring again to FIG. 1, output member 14 transfers torque to a driven device such as a lawnmower blade. Member 14 may comprise a conventional pulley around which a torque transmitting belt is wound and coupled to the driven device.

Rotor 16 is provided for selective engagement with armature 24 to transmit torque between input shaft 12 and output member 14. Rotor 16 is disposed about axis 34 and is coupled to input shaft 12 for rotation therewith. Rotor 16 may be made from conventional metals and metal alloys and includes a hub 38 and a rotor disc 40.

Hub 38 is tubular and defines a central bore into which input shaft 12 extends. Referring to FIG. 2, hub 38 defines an axially extending keyway 42 shaped complementary to, and configured to receive, key 18. Keyway 42 is opposed to keyway 36 of shaft 12 upon assembly of device 10 on shaft 12. At either axial end, hub 38 abuts against and supports bearings 44, 46. At its radially outer diameter, hub 38 defines an axially extending inner rotor pole 48. Hub 38 further defines an axially extending recess 50 radially inwardly of pole 48 for a purpose described hereinbelow.

Disc 40 extends radially outwardly from hub 38. Disc 40 is coupled to hub 38 through, for example, a press-fit relationship including plurality of complementary lugs and notches. As is known in the art, disc 40 may include a plurality of radially spaced rows of angularly spaced, banana shaped slots 52. Upon energization of conduction assembly 22, slots 52 cause magnetic flux to travel back and forth between disc 40 and armature 24 across an air gap enabling a high torque engagement between rotor 16 and armature 24. In the illustrated embodiment, disc 40 includes three rows of slots 52. It should be understood, however, that the number of rows of slots 52 the number of slots 52 in any one row, and the size and shape of slots 52 may vary. At its outer diameter, disc 40 defines an axially extending outer rotor pole 54. Pole 54 is radially aligned with pole 48 and spaced radially outwardly of pole 48.

Key 18 is provided to rotatably couple shaft 12 and rotor 16. Key 18 may be made from conventional metals and metal alloys. Key 18 is configured to be received within opposed keyways 36, 42 of shaft 12 and rotor hub 38, respectively. Key 18 may be generally square or rectangular in cross-section. Referring to FIG. 2, key 18 and keyway 42 may be shaped complementary to one another in such a way that radially inward movement of key 18 relative to rotor 16 after installation of key 18 in keyway 42 is limited. In the illustrated embodiment, key 18 assumes a substantially keystone shape in radial cross-section and tapers moving radially inwardly from its radially outermost edge. In accordance with one embodiment of the present invention, key 18 may be shaped complementary to one or both of support members 30, 32 as discussed in greater detail hereinbelow. Key 18 may have a chamfered or beveled edge 56 at either end to enable easier assembly.

Field shell 20 is provided to house conduction assembly 22. Shell 20 also forms part of a magnetic circuit that causes the selective engagement of rotor 16 and armature 24. Field shell 20 may be made from conventional metals and metal alloys, including steel. Shell 20 is cylindrical and is disposed about axis 34 and is supported on an outer race of bearing 44. Shell 20 is fixed against rotation through, for example, a fastener (not shown) extending through a slot (not shown) in shell 20. Shell 20 is generally U-shaped in cross-section and includes radially inner and radially outer annular members 58, 60.

Inner member 58 is supported on an outer race of bearing 44. Member 58 is generally L-shaped in cross-section and defines an axially extending inner pole 62. Pole 62 extends into recess 50 of hub 38 of rotor 16 and is therefore disposed radially inwardly of inner rotor pole 48. As described more fully in commonly assigned and copending U.S. patent application Ser. No. 11/150,671, the entire disclosure of which is incorporated herein by reference, the relative location of poles 48, 62 is advantageous for several reasons. First, the magnetic efficiency of the magnetic circuit involving rotor 16, field shell 20 and armature 24 is improved by reducing the number of air gaps for at least some of the magnetic flux in the circuit. Second, the annular gap in which conduction assembly 22 is disposed is enlarged enabling easier insertion and fastening of assembly 22 within field shell 20.

Outer member 60 is coupled to and supported on inner member 58. Outer member 60 defines an end wall 64, an axially extending outer pole 66, and a flange 68. End wall 64 extends radially outwardly from member 58. Pole 66 is integral with, and extends axially from, end wall 64. Pole 66 is disposed radially outwardly of pole 54 of rotor 16. Flange 68 is integral with, and extends radially outwardly from, pole 66 at an end of pole 66 opposite end wall 64. Flange 68 extends along at least a portion of the circumference of pole 66.

Conduction assembly 22 is provided to create a magnetic circuit among rotor 16, field shell 20, and armature 24 to cause movement of armature 24 into engagement with rotor 16 and transmission of torque from input shaft 12 to output member 14. Conduction assembly 22 is generally annular and is disposed about axis 34 within field shell 20. In particular, conduction assembly 22 is disposed between the inner and outer poles 62, 66 of shell 20. Assembly 22 includes a conductor 70 and a shell 72.

Conductor 70 may comprise a conventional copper coil although other known conductors may alternatively be used. Conductor 70 may be connected electrically to a power supply (not shown) such as a battery. Upon energization of conductor 70, a magnetic circuit is formed between rotor 16, field shell 20, and armature 24. Magnetic flux flows from outer pole 66 of shell 20 across an air gap to outer pole 54 of rotor 16. Flux then travels back and forth between disc 40 and armature 24 across the air gap between them. Flux then flows from disc 40 of rotor 16 to hub 38 of rotor 16. Finally, flux flows from hub 38 back to members 58, 60 of field shell 20 along several paths. In particular, a portion of the flux flows directly from inner rotor pole 48 to member 60. Another portion of the flux flows from hub 38 through inner pole 62 of member 58 before flowing to member 60. Still another portion of the flux may flow from hub 38 to pulley hub 32 radially inwardly of bearing 44 and then to member 58 and member 60 allowing a portion of the flux to avoid the high density area of inner rotor pole 48 and inner field shell pole 62 and further improving the magnetic efficiency of the circuit.

Shell 72 is provided to house conductor 70 and is also used to mount conductor 70 within field shell 20. Shell 72 may be molded from conventional plastics. Shell 72 may include an integral terminal connector 74 through which conductor 70 may be electrically connected to a power source. Shell 72 may also define one or more lugs (not shown) sized to be received within recesses in end wall 64 of field shell 20 to prevent rotation of conduction assembly 22. Shell 72 may include a radially outwardly extending flange (not shown) disposed proximate outer pole 66 of field shell 20 and affixed to shell 20 at a plurality of points as described in commonly assigned pending U.S. patent application Ser. No. 11/150,670, the entire disclosure of which is incorporated herein by reference.

Armature 24 is provided to transmit a braking torque to output member 14 and to selectively transmit a drive torque from rotor 16 to output member 14. Armature 24 may be made form a variety of conventional metals and metal alloys including steel. Armature 24 is annular in construction and disposed about axis 34. Armature 24 is axially spaced from rotor 16 by an air gap. Like rotor disc 40, armature 24 includes a plurality of radially spaced rows of angularly spaced slots 76 that facilitate travel of magnetic flux back and forth between rotor 16 and armature 24 upon energization of conduction assembly 22. In the illustrated embodiment, armature 24 includes two rows of slots 76. It should be understood that the number of rows of slots 76 on armature 24, the number of slots 76 in any one row, and the size and shape of slots 76 may vary. Armature 24 is coupled to output member 14. In particular, armature 24 may be coupled to output member 14 by a plurality of leaf springs 78. Springs 78 transmit drive and braking torque from armature 24 to output member 14 and allow for axial movement of armature 24 relative to member 14 and towards and away from rotor disc 40. Springs 78 may be made from stainless steel and are connected at one end to armature 24 and at an opposite end to output member 14 using conventional fasteners 80 such as rivets, screws, bolts, or pins.

Brake plate 26 provides a braking surface for engagement by armature 24 to brake output member 14. Plate 26 further forms part of a magnetic circuit with armature 24 and magnets 28 and may provide a means for housing magnet 28. Brake plate 26 may be made from conventional materials having a relatively low magnetic reluctance including conventional metals and metal alloys such as steel. Brake plate 26 extends about at least a portion of the circumference of device 10 and is coupled to field shell 20. In particular, brake plate 26 is coupled to flange 68 of field shell 20 using one or more fasteners 82. Fasteners 82 may be made from non-magnetic materials or materials having a relatively high magnetic reluctance to reduce or eliminate flux transfer between brake plate 26 and field shell 20 and thereby facilitate clutch engagement when conduction assembly 22 is energized. Brake plate 26 may be axially spaced from flange 68 of field shell 20 using one or more spacers 84. Spacers 84 may include bores 86 through which fasteners 82 extend. Spacers 84 may likewise be made from non-magnetic materials or materials having a relatively high magnetic reluctance to reduce or eliminate flux transfer between brake plate 26 and field shell 20.

Magnets 28 are provided to create a magnetic circuit between brake plate 26 and armature 24 to draw armature 24 into engagement with brake plate 26 and provide a braking torque to output member 14. Magnets 28 may comprise neodymium iron boron (Nd—Fe—B) magnets or other known permanent magnets. Magnets 28 are axially aligned with a portion of armature 24 thereby reducing the number of air gaps in the magnetic circuit relative to conventional coupling devices and improving magnetic efficiency, as described in greater detail in commonly assigned, copending U.S. patent application Ser. No. 11/150,027, the entire disclosure of which is incorporated herein by reference. Magnets 28 may be oriented such that magnetic flux travels throughout magnets 28 in an axial, radial, or arcuate (circumferential) direction. Magnets 28 may be received within pockets 88 formed in brake plate 26. Alternatively, magnets 28 may instead be received within a pocket formed in armature 24 and axially aligned with brake plate 26. Magnets 28 may be arranged such that one face of each magnet 28 is flush with one side (and the braking surface) of brake plate 26 (or armature 24). By placing magnets 28 such that one face is flush with the braking surface of brake plate 26 (or armature 24), magnets 28 add to the wear surface of brake plate 26 (or armature 24) increasing its wear resistance and the braking surface.

Figure 3:
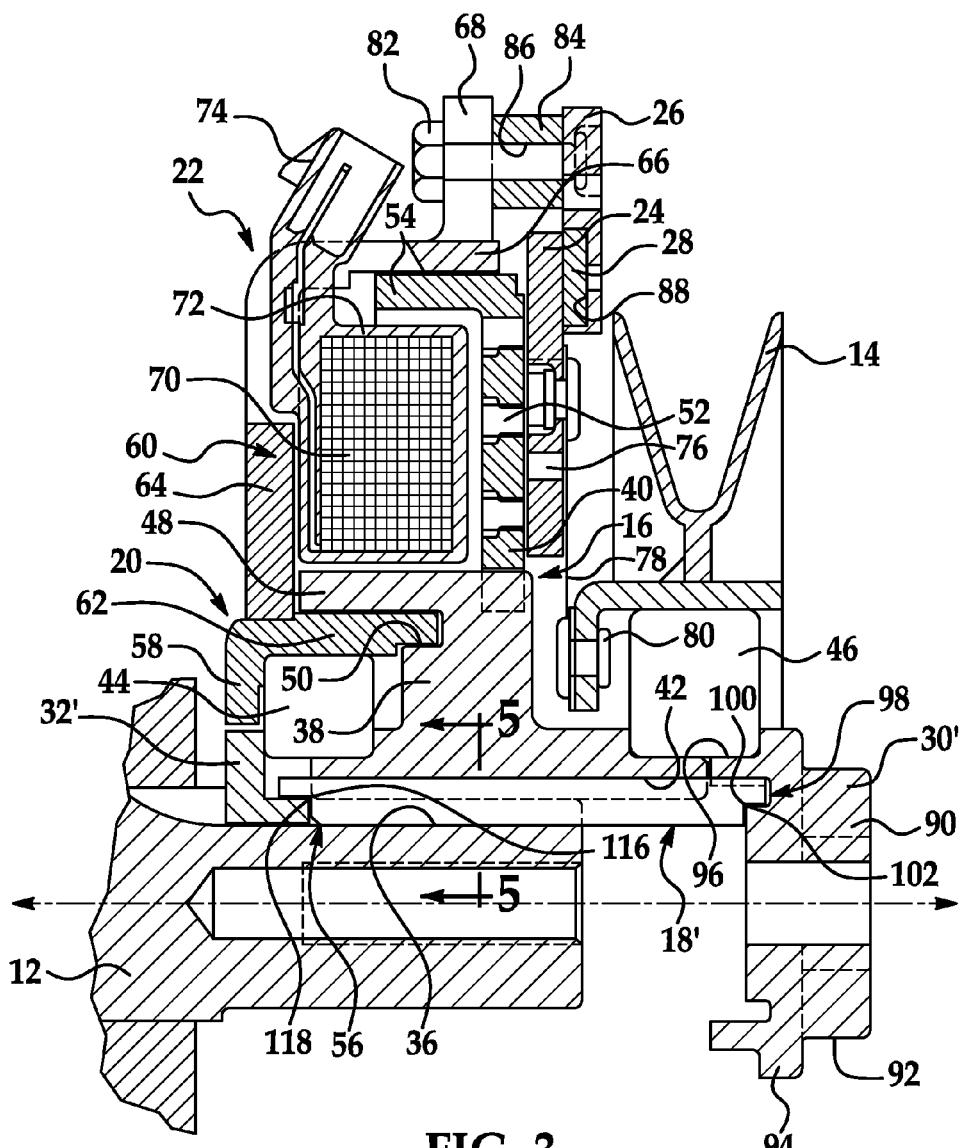
FIG. 3 is a partial cross-sectional view of a rotational coupling device in accordance with another embodiment of the present invention.

Spacer 30 is provided to support output member 14 in assembled relation with the other components of device 10 and may be made from conventional materials including powdered metals. Spacer 30 is disposed about axis 34 and is generally cylindrical in shape. Spacer 30 is configured to receive a fastener (not shown) that extends through spacer 30 and into input shaft 12. Spacer 30 may define a head 90 at one axial end having a plurality of flats 92 that allow input shaft 12 to be secured while applying torque to the fastener. Spacer 30 may further define a body 94 extending axially from head 90. Body 94 has a generally cylindrical outer surface 96 on which bearing 46 may be supported between opposed shoulders on rotor hub 38 and spacer 30. In accordance with the present invention, spacer 30 is shaped in a complementary fashion relative to key 18 to limit radial and axial movement of key 18 relative to spacer 30. As shown in FIG. 1, spacer 30 may define an axially extending recess 98 closed at one axial end and configured to receive one end of key 18. Upon assembly of device 10, radially inward and outward movement of key 18 is limited relative to spacer 30 and axial movement of key 18 relative to spacer 30 is also limited in one axial direction (to the right in FIG. 1). In the embodiment illustrated in FIG. 1, the end of key 18 received within recess 98 has the same or substantially the same shape as the center of key 18 disposed within input shaft 12. Referring to FIG. 3, however, in another embodiment of the invention a key 18' may be formed with a step at its end such that key 18' and a spacer 30' define complementary, abutting shoulders 100, 102. It should be understood that the key 18 or 18' and spacer 30 or 30' could be shaped in a plurality of ways provided that key 18 or 18' and spacer 30 or 30' are shaped in a complementary fashion to limit radial movement of key 18 or 18' relative to spacer 30 or 30' in at least one radial direction and axial movement of key 18 or 18' relative to spacer 30 or 30' in at least one axial direction.

Referring again to FIG. 1, pulley hub 32 is provided to support various components of device 10 including a drive pulley 104 that may be used to provide a constant driving torque (as opposed to the selective torque provided by output member 14) for various purposes depending on the application of device 10. Hub 32 may be made from conventional metals and metal alloys. Hub 32 is generally cylindrical in shape and defines a central bore 106 configured to receive input shaft 12. Hub 32 defines a cylindrical outer surface 108 and supports bearing 44 which may be captured between opposed shoulders in pulley hub 32 and rotor hub 38. Hub 32 may also provide a path for transmission of flux between rotor hub 38 and member 58 of field shell 20. In accordance with the present invention, hub 32 is shaped in a complementary fashion relative to key 18 to limit radial and axial movement of key 18 relative to hub 32. As shown in the illustrated embodiment, hub 32 may define a reduced diameter portion 110 configured to receive one end of key 18 opposite the end of key 18 received within recess 98 of spacer 30. The end of key 18 may include a step such that key 18 and hub 32 define complementary abutting shoulders 112, 114. Upon assembly of device 10, radially inward and outward movement of key 18 relative to hub 32 is limited and axial movement of key 18 relative to hub 32 is also limited in one axial direction (to the left in FIG. 1). It should again be understood that key 18 and hub 32 could be shaped in a plurality of ways provided that key 18 and hub 32 are shaped in a complementary fashion to limit radial movement of key 18 relative to hub 32 in at least one radial direction and axial movement of key 18 relative to spacer 30 in at least one axial direction. Referring to FIG. 3, in another embodiment of the invention drive pulley 104 may be eliminated and hub 32' may assume a different shape. As shown in FIG. 3, hub 32' is still shaped complementary to key 18' with hub 32' and key 18' defining complementary abutting shoulders 116, 118. Hub 32' limits radial movement of key 18 relative to hub 32' in a radially inward direction. Key 18' is restrained from radially outward movement by rotor 16 and spacer 30'. Although hubs 32, 32' are shown on an opposite end of device 10 relative to output member 14, it should again be understood that the orientation of shaft 12, spacer 30, 30' and hubs 32, 32' could be reversed such that input shaft 12 is inserted into device 10 on the same side as output member 14 and spacers 30, 30' and hubs 32, 32' are disposed on opposite sides of device 10 relative to their locations in FIGS. 1 and 3.

Figure 4:
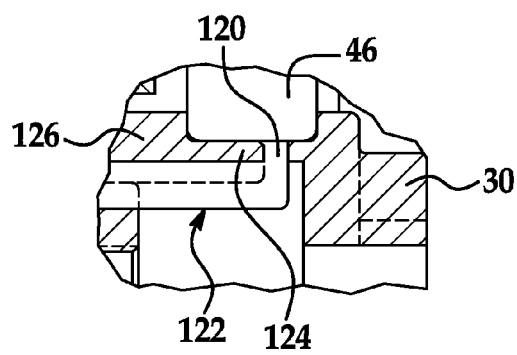
FIG. 4 is an enlarged cross-sectional view of a portion of a rotational coupling device in accordance with another embodiment of the present invention.
Figure 5:
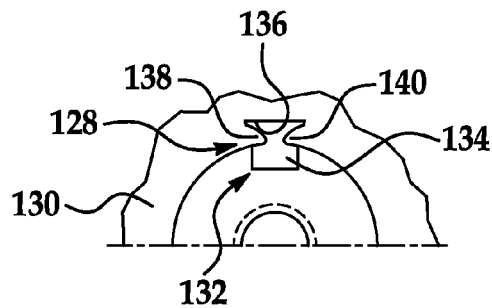
FIG. 5 is an enlarged plan view of a portion of a rotational coupling device in accordance with another embodiment of the present invention.

Referring now to FIGS. 4-5, in an another embodiment of the invention one axial end of the key and/or the rotor may be deformed such that the ends of the key and rotor are axially aligned to thereby limit axial movement of the key relative to the rotor in at least one axial direction. Referring to FIG. 4, in accordance with one embodiment of the invention one axial end 120 of a key 122 may be deformed and flared radially outwardly such that the end 120 is axially aligned with one axial end 124 of the hub of rotor 126 relative to the axis of rotation of input shaft 12 and rotor 126. As a result, key 122 is restrained against axial movement in at least one axial direction (to the left in FIG. 4) relative to rotor 126. Radial movement of key 122 relative to rotor 126 may be restricted through the shape of key 122 and the keyway in rotor 126 as described with reference to FIG. 2 above or through the complementary shape of a support member such as spacer 30, 30' or hub 32, 32' at an opposite axial end of key 122.

Referring to FIG. 5, in accordance with another embodiment of the invention one axial end 128 of a rotor 130 may be deformed such that the end 128 is axially aligned with one axial end 132 of a key 134 relative to the axis of rotation of input shaft 12 and rotor 130. In particular, the edges forming the radial walls of a keyway 136 in rotor 130 could be deformed inwardly (i.e., by staking) so that portions 138, 140 of the axial end 128 of rotor 130 becomes axially aligned with the axial end 132 of key 134. As a result, key 134 is again restrained against axial movement in at least one axial direction relative to rotor 130. Radial movement of key 134 relative to rotor 130 may again be restricted through the shape of key 134 and keyway 136 in rotor 130 as described with reference to FIG. 2 above or through the complementary shape of a support member such as spacer 30, 30' or hub 32, 32' and an opposite axial end of key 134. Radial movement of key 134 may also be restricted by pressing portions 138, 140 of the axial end 128 of rotor 130 into key 134 (either into pre-formed recesses formed in the axial end 132 of key 134 or through deformation of end 132 of key 134 during the inward movement of the radial walls of keyway 136 described above).

While the invention has been shown and described with reference to one or more particular embodiments thereof, it will be understood by those of skill in the art that various changes and modifications can be made without departing from the spirit and scope of the invention.

I claim:

1. A rotational coupling device, comprising:
    a rotor disposed about an input shaft, said input shaft disposed about a rotational axis and said rotor and said input shaft defining opposed keyways;
    a key disposed within said opposed keyways of said rotor and said input shaft, said key rotatably coupling said rotor and said input shaft;
    an armature disposed about said axis, said armature coupled to an output member and configured for selective engagement with said rotor; and,
    a first support member disposed about said axis and configured to receive said key, said key separable from said first support member
    wherein said key and said first support member are shaped complementary to one another to limit radial movement of said key relative to said first support member in a first radial direction and in a second radial direction opposite said first direction and to limit axial movement of said key relative to said first support member in a first axial direction.

2. The rotational coupling device of claim 1 wherein said first support member is a spacer fastened to one end of said input shaft.

3. The rotational coupling device of claim 1 wherein said first support member is a hub disposed about said input shaft.

4. The rotational coupling device of claim 1 wherein said first support member defines a recess closed at one axial end and configured to receive one end of said key.

5. The rotational coupling device of claim 1, further comprising a second support member disposed about said axis and configured to receive said key wherein said key and said second support member are shaped complementary to one another to limit radial movement of said key relative to said second support member in one of said first radial direction and said second radial direction and to limit axial movement of said key relative to said second support member in a second axial direction opposite said first axial direction.

6. The rotational coupling device of claim 5 wherein said first and second support members are disposed at opposite axial ends of said key.

7. The rotational coupling device of claim 1, further comprising:
    a field shell disposed about said input shaft and fixed against rotation; and,
    an electrical conductor disposed within said field shell on a side of said rotor opposite said armature.

8. The rotational coupling device of claim 1 wherein a portion of said key is disposed radially between radially inner and radially outer portions of said first support member.

9. A rotational coupling device, comprising:
    a rotor disposed about an input shaft, said input shaft disposed about a rotational axis and said rotor and said input shaft defining opposed keyways;
    a key disposed within said opposed keyways of said rotor and said input shaft, said key rotatably coupling said rotor and said input shaft;

an armature disposed about said axis, said armature coupled to an output member and configured for selective engagement with said rotor; and, a first support member disposed about said axis and configured to receive said key wherein said key and said first support member are shaped complementary to one another to limit radial movement of said key relative to said first support member in a first radial direction and to limit axial movement of said key relative to said first support member in a first axial direction, said key defining a radially inner portion and a radially outer portion, one of said radially inner and radially outer portions extending axially further than another of said radially inner and radially outer portions and defining an axially extending surface intermediate the radially innermost and radially outermost surfaces of said key, said axially extending surface terminating at a radially extending surface in said another of said radially inner and radially outer portions to thereby define a first shoulder, said first shoulder abutting a second shoulder formed in said first support member at an intersection of a radially extending surface in an axial end face of said first support member and an axially extending surface of said first support member.

10. The rotational coupling device of claim 9 wherein said first support member is a spacer fastened to one end of said input shaft.

11. The rotational coupling device of claim 9 wherein said first support member is a hub disposed about said input shaft.

12. The rotational coupling device of claim 9 wherein said first support member defines a recess closed at one axial end and configured to receive one end of said key.

13. The rotational coupling device of claim 9, further comprising a second support member disposed about said axis and configured to receive said key wherein said key and said second support member are shaped complementary to one another to limit radial movement of said key relative to said second support member in one of said first radial direction and a second radial direction and to limit axial movement of said key relative to said second support member in a second axial direction opposite said first axial direction.

14. The rotational coupling device of claim 13 wherein said first and second support members are disposed at opposite axial ends of said key.

15. The rotational coupling device of claim 9, further comprising:
a field shell disposed about said input shaft and fixed against rotation; and,
an electrical conductor disposed within said field shell on a side of said rotor opposite said armature.

16. A rotational coupling device, comprising:
a rotor disposed about an input shaft, said input shaft disposed about a rotational axis and said rotor and said input shaft defining opposed keyways;
a key disposed within said opposed keyways of said rotor and said input shaft, said key separable from said rotor and rotatably coupling said rotor and said input shaft;
an armature disposed about said axis, said armature coupled to an output member and configured for selective engagement with said rotor;
wherein said key and said rotor are shaped complementary to one another to limit radial movement of said key relative to said rotor in a first radial direction away from said rotor; and
a first support member disposed about said axis and configured to receive said key wherein said key and said first support member are shaped complementary to one another to limit radial movement of said key relative to said first support member in one of said first radial direction and a second radial direction opposite said first radial direction and to limit axial movement of said key relative to said first support member in a first axial direction.

17. The rotational coupling device of claim 16 wherein a portion of said key is disposed radially between radially inner and radially outer portions of said rotor.

18. The rotational coupling device of claim 16 wherein said first support member is a spacer fastened to one end of said input shaft.

19. The rotational coupling device of claim 16 wherein said first support member is a hub disposed about said input shaft.

20. The rotational coupling device of claim 16, further comprising a second support member disposed about said axis and configured to receive said key wherein said key and said second support member are shaped complementary to one another to limit radial movement of said key relative to said second support member in one of said first radial direction and said second radial direction and to limit axial movement of said key relative to said second support member in a second axial direction opposite said first axial direction.

21. A rotational coupling device, comprising:
a rotor disposed about an input shaft, said input shaft disposed about a rotational axis and said rotor and said input shaft defining opposed keyways;
a key disposed within said opposed keyways of said rotor and said input shaft, said key separable from said rotor and rotatably coupling said rotor and said input shaft;
an armature disposed about said axis, said armature coupled to an output member and configured for selective engagement with said rotor;
wherein said key and said rotor are shaped complementary to one another to limit radial movement of said key relative to said rotor in a first radial direction away from said rotor
wherein one of a first axial end of said key and a first axial end of said rotor is axially aligned with another of said first axial end of said key and said first axial end of said rotor to limit axial movement of said key relative to said rotor in a first axial direction
wherein one of a second axial end of said key and a second axial end of said rotor is axially aligned with another of said second axial end of said key and said second axial end of said rotor to limit axial movement of said key relative to said rotor in a second axial direction opposite said first axial direction.

22. The rotational coupling device of claim 16, further comprising:
a field shell disposed about said input shaft and fixed against rotation; and,
an electrical conductor disposed within said field shell on a side of said rotor opposite said armature.

* * * * *